(12) United States Patent
Borek et al.

(10) Patent No.: US 9,938,866 B2
(45) Date of Patent: Apr. 10, 2018

(54) DEVICE FOR SUPPLYING LUBRICANT TO A LUBRICATION POINT IN A MACHINE

(71) Applicants: Andreas Borek, Hockenheim (DE); Juergen Kreutzkaemper, Waibstadt-Daisbach (DE); Sefan Frank, Ilvesheim (DE); Stefan Schuermann, Walldorf (DE)

(72) Inventors: Andreas Borek, Hockenheim (DE); Juergen Kreutzkaemper, Waibstadt-Daisbach (DE); Sefan Frank, Ilvesheim (DE); Stefan Schuermann, Walldorf (DE)

(73) Assignee: SKF LUBRICATION SYSTEMS GERMANY AG, Berlin (DE)

( * ) Notice: Subject to any disclaimer, the term of this patent is extended or adjusted under 35 U.S.C. 154(b) by 848 days.

(21) Appl. No.: 14/191,896

(22) Filed: Feb. 27, 2014

(65) Prior Publication Data

US 2014/0238742 A1 Aug. 28, 2014
US 2017/0241307 A9 Aug. 24, 2017

(30) Foreign Application Priority Data

Feb. 27, 2013 (DE) .................. 10 2013 203 263

(51) Int. Cl.
*F01M 1/16* (2006.01)
*E21B 10/24* (2006.01)

(52) U.S. Cl.
CPC ............. *F01M 1/16* (2013.01); *E21B 10/246* (2013.01); *F16N 2250/05* (2013.01); *F16N 2250/06* (2013.01)

(58) Field of Classification Search
CPC .... F16N 7/22; F16N 2250/04; F16N 2250/05; F16N 2250/06; E21B 10/22; E21B 10/23;
(Continued)

(56) References Cited

U.S. PATENT DOCUMENTS 4,406,169 A * 9/1983 Ikeuchi ................. G01M 13/04
340/682
4,453,836 A * 6/1984 Klima ..................... E21B 10/25
175/371
(Continued)

FOREIGN PATENT DOCUMENTS

CN 101182901 A 5/2008
DE 1302722 A 11/1970
(Continued)

*Primary Examiner* — Minh Truong
(74) *Attorney, Agent, or Firm* — Bryan Peckjian; SKF USA Inc. Patent Dept.

(57) ABSTRACT

A device for supplying lubricant to a lubrication point in a machine, a tunnel boring machine, for example, includes a lubrication pump unit and a control unit. The lubrication pump unit is configured to supply a quantity of the lubricant to the lubrication point, and the control unit is configured to regulate the quantity of lubricant based on a sensor measurement signal. The sensor measurement signal may be based on a temperature measured in a region of the lubrication point, a pressure measured in a region of the lubrication point, a measured viscosity of the lubricant, a measured dielectricity of the lubricant, a measured water content of the lubricant, a vibration intensity measured at a part of the machine, or a measured rotational speed of a part of the machine.

14 Claims, 5 Drawing Sheets

(58) Field of Classification Search
CPC ........ E21B 10/24; E21B 10/246; E21B 10/25; E21B 2010/225; E21B 2010/243; F01M 1/16
See application file for complete search history.

(56) References Cited

U.S. PATENT DOCUMENTS

| | | | | |
|---|---|---|---|---|
| 4,464,720 | A * | 8/1984 | Agarwal | F04D 27/0207 415/1 |
| 5,320,196 | A * | 6/1994 | Mouton | F01M 11/10 184/104.1 |
| 5,711,615 | A | 1/1998 | Stitz et al. | |
| 5,798,941 | A * | 8/1998 | McLeister | G05B 11/42 415/1 |
| 5,878,842 | A | 3/1999 | Rake | |
| 5,964,318 | A | 10/1999 | Boyle et al. | |
| 6,170,611 | B1 * | 1/2001 | Daly | F16N 7/385 175/228 |
| 6,374,950 | B1 | 4/2002 | Takeno | |
| 6,443,690 | B1 * | 9/2002 | Zabrecky | F01D 3/04 415/107 |
| 6,546,785 | B1 | 4/2003 | Discenzo | |
| 6,698,536 | B2 * | 3/2004 | Moran | E21B 10/24 175/227 |
| 7,036,464 | B2 | 5/2006 | Luther et al. | |
| 7,571,597 | B2 | 8/2009 | Delaloye | |
| 9,353,849 | B2 * | 5/2016 | Uusitalo | F16H 57/0435 |
| 2004/0222018 | A1 * | 11/2004 | Sullivan | E21B 10/08 175/39 |
| 2010/0187043 | A1 * | 7/2010 | Murahashi | F16H 57/0434 184/6.3 |
| 2011/0188988 | A1 * | 8/2011 | Wadehn | F03D 1/0658 415/1 |
| 2012/0134847 | A1 * | 5/2012 | Conley | F16N 7/14 417/15 |
| 2013/0075198 | A1 | 3/2013 | Uusitalo et al. | |
| 2013/0214537 | A1 * | 8/2013 | Hashimoto | F03D 15/00 290/55 |

FOREIGN PATENT DOCUMENTS

| | | |
|---|---|---|
| DE | 2227467 A1 | 2/1973 |
| DE | 69918193 T2 | 7/2005 |
| DE | 102004032453 A1 | 1/2006 |
| DE | 102005034712 A1 | 2/2006 |
| DE | 102010020759 A1 | 11/2011 |
| EP | 1387960 B1 | 8/2004 |
| GB | 1365518 A | 9/1974 |
| WO | 03033957 A1 | 4/2003 |
| WO | 2012074626 A1 | 6/2012 |

* cited by examiner

DEVICE FOR SUPPLYING LUBRICANT TO A LUBRICATION POINT IN A MACHINE

CROSS-REFERENCE TO RELATED APPLICATIONS

This application claims priority to German patent application no. 10 2013 203 263.3 filed on Feb. 27, 2013, the contents of which are fully incorporated herein by reference.

TECHNOLOGICAL FIELD

Exemplary embodiments relate to lubrication systems of machines, and in particular to a device and a method for supplying lubricant to a lubrication point in a machine.

BACKGROUND

Many machines include parts that move relative to one another when the machine is in operation. In order to minimize damage caused by parts rubbing against one another, it is often necessary to supply lubricant to locations where the rubbing occurs. In total loss lubrication systems or circulating lubrication systems, the lubricant must be continuously guided (provided) via a lubrication system to the lubrication points. Because underlubrication, i.e. supplying insufficient lubricant, is nearly always undesirable, in many cases a constant overlubrication is preferable and therefore tolerated. This can, among other things, lead to high losses of lubricant.

There is therefore a need for a method and/or device for supplying lubricant to a lubrication point in a machine in a manner that reduces the consumption of lubricant.

SUMMARY

A device according to an exemplary embodiment for supplying lubricant to a lubrication point in a machine includes a lubricant pump unit and a control unit. The lubricant pump unit is configured to supply lubricant to a lubrication point. The control unit is configured to regulate, based on a sensor signal, a quantity of lubricant supplied from the lubricant pump unit to the lubrication point. The sensor signal depends on a temperature measured in a region of the lubrication point, a pressure measured in a region of the lubrication point, a measured viscosity of the lubricant, a measured dielectricity of the lubricant, a measured water content of the lubricant, a vibration intensity measured at a part of the machine, or a measured rotational speed of a part of the machine (or any combination of two or more of these measured quantities), so that the control unit regulates the supplied quantity of lubricant in a temperature-dependent or pressure-dependent manner.

Exemplary embodiments of a device for supplying lubricant to a lubrication point in a machine are based on the recognition that under different operating conditions, specifically at different pressures, temperatures, viscosities of the lubricant, dielectricities of the lubricant, water contents of the lubricant, vibration intensities, and/or rotational speeds, different quantities of lubricant are needed. Therefore, the lubricant supply can be adapted to the respective operating conditions in order to reduce the consumption of lubricant. For example, if the lubricant has a higher viscosity at lower temperatures, less lubricant can be supplied at lower temperatures than at higher temperatures. In addition, for example, when the external pressure is low, the pressure of the lubricant at the lubrication point can also be reduced. This is because it is usually sufficient to keep the pressure at the lubrication point slightly higher than the external pressure to help ensure that no external impurities enter into the lubrication point. Lubricant consumption in a machine can thus be significantly reduced by the disclosed embodiments. In addition, machine operation can be made more reliable because the risk of underlubrication is reduced.

In some exemplary embodiments, the device for supplying lubricant includes a sensor unit that measures a temperature or a pressure in the region of the lubrication point and provides the sensor measurement signal, which depends on the measured temperature or the measured pressure, to the control unit.

Some exemplary embodiments are directed to a total loss lubrication apparatus or a circulating lubrication apparatus that includes a device according to the disclosed embodiments.

In some exemplary embodiments, a seal is disposed between the lubrication point and an external region of the machine. By adjusting the lubricant supply based on the pressure or temperature, a loss of lubricant past (over) the seal to the outside can be significantly reduced.

BRIEF DESCRIPTION OF THE DRAWINGS

Exemplary embodiments are described in more detail below with reference to the accompanying Figures.

DETAILED DESCRIPTION

In the following discussion, the same reference numbers are sometimes used with various described exemplary embodiments for objects and functional units which have the same or similar functional properties. Furthermore, optional features of the different exemplary embodiments may be combinable or interchangeable with one another.

Figure 1:
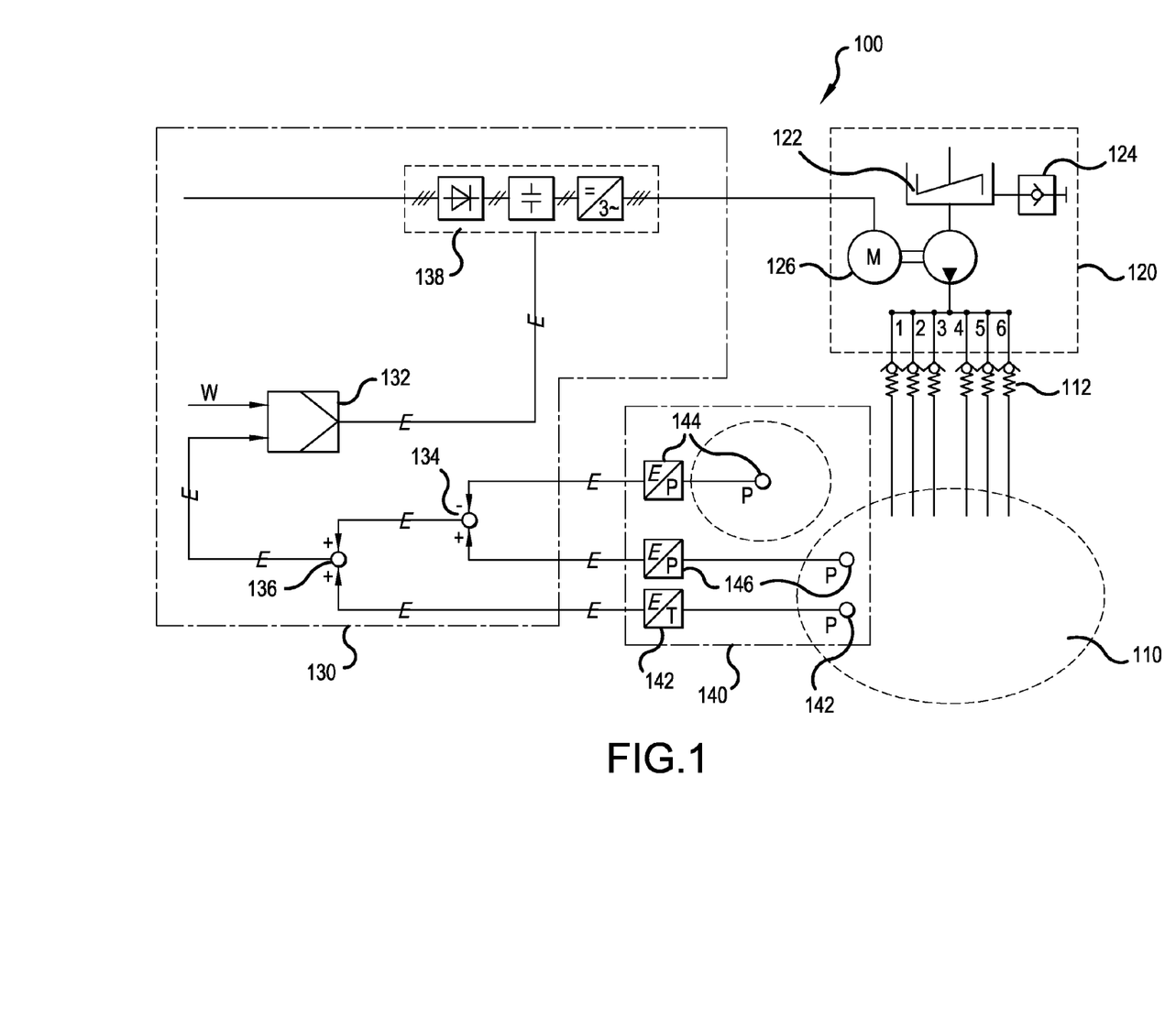
FIG. 1 is a schematic diagram, with lubrication system circuit symbols, showing a device according to an embodiment for supplying lubricant, the device including an electric motor drive.

FIG. 1 shows, as an exemplary embodiment, a block diagram of a device 100 for supplying lubricant to a lubrication point 110 in a machine. The device 100 includes a lubricant pump unit 120 connected to a control unit 130. The lubricant pump unit 120 supplies lubricant to a lubrication point 110. The control unit 130 is connected to the lubricant pump unit 120 and regulates, based on a sensor measurement signal, a quantity of lubricant supplied from the lubricant pump unit 120 to the lubrication point 110. The sensor measurement signal depends on a temperature measured in a region of the lubrication point 110, a pressure measured in a region of the lubrication point 110, a measured viscosity of the lubricant, a measured dielectricity (or a dielectric constant) of the lubricant, a measured water content of the lubricant, a vibration intensity measured at a part of the machine, and/or a measured rotational speed of a part of the machine, so that the control unit 130 regulates the supplied quantity of lubricant in a temperature-dependent, pressure-dependent, viscosity-dependent, vibration-dependent, and/or rotational-speed-dependent manner.

By regulating the supplying (or the supply) of lubricant in a manner which depends on a temperature measured in the region of the lubrication point 110, on a pressure measured in the region of the lubrication point 110, on a measured viscosity of the lubricant, on a dielectricity of the lubricant, on a water content of the lubricant, on a vibration intensity measured at a part of the machine, or on a measured rotational speed of a part of the machine, lubricant consumption can be significantly reduced. This is because less lubricant may be needed at lower temperatures, for example. In addition, machine operation can be made more reliable because the risk of underlubrication is reduced.

The supplying of lubricant can be regulated in a manner which is temperature-dependent, pressure-dependent, viscosity-dependent, dielectricity-dependent, water-content-dependent, vibration-dependent, or rotational-speed-dependent. Alternatively, the supplying of lubricant can be regulated in a manner which depends on two or more of the parameters mentioned above, wherein any combination or number of parameters can be selected on which the regulation of the supplying of lubricant depends.

The lubrication point 110 can be any region in a machine wherein parts that are movable with respect to one another can come into contact, such as, for example, bearings or seals of rotating shafts. In other words, the lubrication point 110 is a point at which two parts which are movable with respect to one another should be protected from damage or wear by the lubricant.

The supplied quantity of lubricant may be a measured quantity or it may be specified in quantity per unit time, e.g. $cm^3/min$.

The measurement is effected (performed) in a region of the lubrication point, where a "region" is understood to mean a region in which the temperature measurement or the pressure measurement allows a statement (conclusion) to be made about the prevailing conditions at the lubrication point 110. This applies not only to the direct region or the volume which is provided for the lubricant at the lubrication point, but also for example to an external region of the machine in the vicinity of the lubrication point (e.g. less than 50 cm, 20 cm, or 10 cm away from the region provided for the lubricant).

The term "machine" as used herein can be any component that includes movable parts. Machines can for example be construction machines, industrial machines, vehicles, engines, turbines, generators, household appliances, or parts thereof.

The lubricant, also referred to as lubricating medium, may include, for example grease, oil, or another lubricant necessary or suitable for the respective lubrication point.

FIG. 1 shows, as a specific example, additional optional or alternative implementation possibilities of the described concept, as well as examples of a possible implementation of the lubricant pump unit 120 and the control unit 130. These elements, however, as will also be shown in the subsequent exemplary embodiments, among others, can also be implemented in other ways.

The control unit 130 regulates the quantity of lubricant based on a sensor measurement signal. The control unit 130 can receive the sensor measurement signal from a sensor unit 140 which may, for example, measure a temperature or a pressure, a viscosity of the lubricant (measurable e.g. using a rheometer for example in the container/reservoir, in the pipe conduit, or in a bypass of the pipe conduit), a measured dielectricity (or measured conductivity) of the lubricant, a measured water content of the lubricant, a vibration intensity (or oscillation intensity or acceleration intensity) at a part of the machine (e.g. measurable using an accelerometer) and/or a rotational speed of a part of the machine (e.g. drive rotational speed of the main drive of the cutter head) in the region of the lubrication point. The sensor unit 140 provides the sensor signal, which is dependent on the measured temperature or the measured pressure, to the control unit 130.

The sensor unit 140 can, for example, convert the measured pressure or the measured temperature into an electrical signal and provide this sensor measurement signal to the control unit 130.

For example, the sensor unit 140 can include a temperature sensor 142 which is disposed in a region of the lubrication point 110 for the lubricant in order to measure the temperature of the lubricant at the lubrication point 110. A direct contact of the temperature sensor with the lubricant at the lubrication point is generally preferable in order to obtain an accurate temperature measurement. Alternatively the temperature sensor could be in thermal contact with the lubricant via a material having good thermal conductivity (e.g. a metal).

Alternatively or additionally, the sensor unit 140 can include a pressure sensor which is disposed in a region external to the region of the lubrication point 110 (external region in the region of the lubrication point) in order measure a pressure outside the lubrication point 110. Many machines operate in environments wherein the external (environmental) pressure is subject to significant fluctuations. With increased external pressure there comes a risk that contaminants will enter into the lubrication point 110; however, this can be prevented by a keeping the pressure of the lubricant high, for example, by an increase in the lubricant supply rate. Conversely, according to the described concept, the supplying of lubricant can be reduced if the external pressure is lower that the pressure in the region of the lubrication point 110. The consumption of lubricant can thus be significantly reduced by taking external pressure into account.

The "external region in the region of the lubrication point" is understood to mean, e.g., a region which is not contained by the region that is provided for the lubricant, and it can also be spaced somewhat away from the lubrication point, but which region allows conclusions to be drawn about the external pressure at the lubrication point. Depending on the size of the machine, the measuring point of the pressure sensor can be at most, for example, 50 cm (or 20 cm, 10 cm, or 5 cm) spaced away from the lubrication point 110.

In other words, the control unit 130 can regulate the quantity of lubricant supplied from the lubricant pump unit 120 to the lubrication point 110 so that the pressure of the lubricant at the lubrication point 110 is the same as or higher than the pressure measured outside the lubrication point 110.

Additionally or alternatively, the sensor unit 140 can include a further or second pressure sensor 146 which is disposed in a region provided for the lubricant at the lubrication point 110 in order to measure the pressure of the lubricant at the lubrication point 110. While it is possible to draw conclusions about the pressure of the lubricant at the lubrication point 110 based on the supplied quantity of lubricant, this can change over time, for example, due to wear and tear of seals. Therefore, a more accurate statement about (determination of) the pressure of the lubricant at the lubrication point 110 can be made by a second pressure sensor 146 at the lubrication point 110.

For example, the first pressure sensor 144 may provide a first sensor measurement signal to the control unit 130, and the second pressure sensor 146 may provide a second sensor measurement signal to the control unit 130. The control unit 130 can then regulate the quantity of lubricant supplied from the lubricant pump unit 120 to the lubrication point 110 based on a differential signal derived from the first sensor measurement signal and the second sensor measurement signal. For this purpose the control unit 130 can, for example, include a subtractor (e.g., a differencing op amp) 134 which forms an electrical differential signal from the first sensor measurement signal and the second sensor measurement signal.

The generation of a differential signal is a simple way to associate/connect the two measured pressure values and control the supplying of lubricant using the generated differential signal. However, it is equally possible to combine the first sensor measurement signal of the first pressure sensor 144 with the second sensor measurement signal of the second pressure sensor 146 in another way.

FIG. 1 shows an example of an embodiment that includes a temperature sensor 142 as well as a first pressure sensor 144 in the external region of the lubrication point 110 (upstream of the lubrication point) and a second pressure sensor 146 in a region provided at the lubrication point 110 for the lubricant. These sensors are used to carry out both a temperature measurement and a differential pressure measurement. The control unit 130 thus produces a differential signal from the first sensor measurement signal of the first pressure sensor 144 and the second sensor measurement signal of the second pressure sensor 146. The temperature sensor 142 provides a third sensor measurement signal, and the control unit 130 regulates the quantity of lubricant supplied from the lubricant pump unit 120 to the lubrication point 110 based on a sum signal of the third sensor measurement signal and the differential signal. For this purpose the control unit 130 includes an adder 136 which sums the electrical differential signal and the electrical third signal to an electrical sum signal.

The sum of the differential signals and the third sensor measurement signal is one possible way of using the information of the two pressure sensors and the temperature sensor for regulating the lubricant supply. However, it is also possible to combine the differential signal and the third sensor measurement signal with each other in other ways to regulate the supplying of lubricant.

In general, the control unit 130 can have a first combiner for combining the first sensor measurement signal of the first pressure sensor 144 and the second sensor measurement signal of the second pressure sensor 146, and a second combiner for combining the output signal of the first combiner with the third sensor measurement signal of the temperature sensor.

Optionally or alternatively, the control unit 130 can include a controller (regulator) 132 which generates a comparison signal based on a comparison of a setpoint value w with the sensor measurement signal of the sensor unit 140, the above-described differential signal, or the above-described sum signal. The control unit 130 can then regulate the quantity of lubricant supplied from the lubricant pump unit 120 to the lubrication point 110 based on the comparison signal. Depending on the specific implementation, the controller 132 may compare the setpoint value w with the sensor measurement signal, the differential signal, or the sum signal. If the sensor unit 140 includes, for example, only one pressure sensor 144, 146, or only one temperature sensor 142, then the setpoint value w can be directly compared with the sensor measurement signal of the sensor unit 140. If the sensor unit 140, for example, includes a first pressure sensor 144 and a second pressure sensor 146, the controller 132 can compare the setpoint value w with the differential signal. Alternatively the controller 132 can compare the setpoint value w with the sum signal if the sensor unit 140 includes either a temperature sensor 142 and only one pressure sensor 144, 146, or a temperature sensor 142, a first pressure sensor 144, and a second pressure sensor 146, as shown in the example of FIG. 1.

The lubricant pump unit 120 or lubricant pump may include an electric motor 126, and the control unit 130 may regulate the power (output or performance) of the electric motor, and thus regulate the quantity of lubricant supplied per time unit. A possible implementation of the regulation of the electric motor 126 is shown in FIG. 1. For this purpose, the control unit 130 includes a variable-frequency drive (VFD) 138 which varies a frequency of the supply current of the electric motor 126 of the lubricant pump unit 120 in order to control the rotational speed of the electric motor and thus the delivery rate of the lubricant pump unit 120. For this purpose the variable-frequency drive 138 is, for example, connected to the controller 132 and is controlled by the comparison signal.

In addition, the lubricant pump unit 120 can include a container (reservoir) containing lubricant 122 and a valve 124 for filling the container 122. Furthermore, the lubricant pump unit can be connected via pump lines (conduits) to the lubrication point 110 of the machine. In this case each lubricant line between the lubricant pump unit 120 and the lubrication point 110 may include a check valve 112.

It is possible that the temperature and/or the pressure is measured at a lubrication point 110 and that the supplying of lubricant is only regulated at this lubrication point 110. Alternatively, the temperature and/or the pressure can be measured at only one lubrication point 110, and depending on that measurement. the supplying of lubricant can be regulated to a plurality of lubrication points 110, as is shown, for example, in FIG. 1. In another alternative, the temperature and/or the pressure can be measured at a plurality of lubrication points 110 independently of one another, and the supplying of lubricant to the respective lubrication points 110 can be individually regulated via the respective sensor measurement signals.

The concept described can be realized, for example, in a total loss lubrication apparatus or circulating lubrication apparatus by integration (inclusion) of the device 100.

Figure 2:
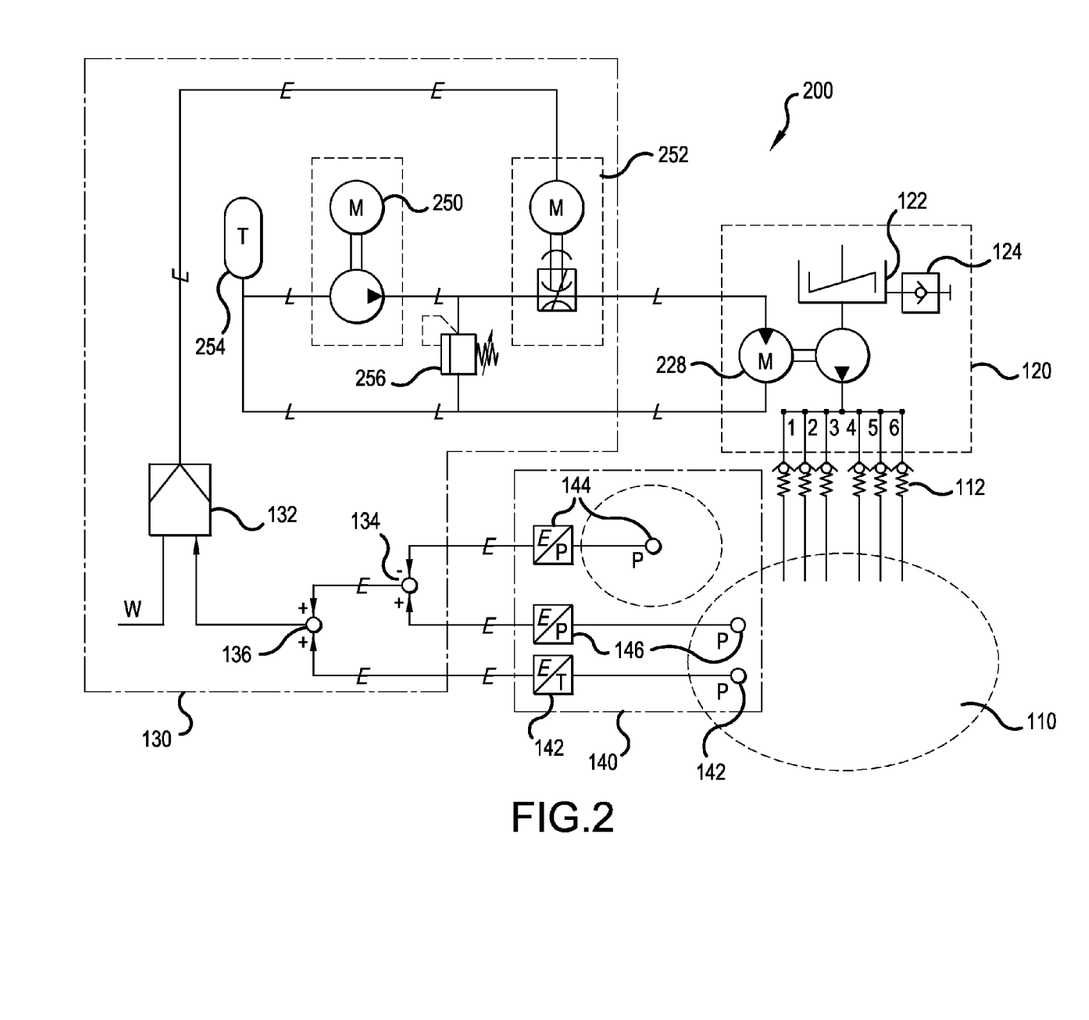
FIG. 2 is a schematic diagram, with lubrication system circuit symbols, showing a device according to an embodiment for supplying lubricant, the device including a hydraulic motor drive.

FIG. 2 shows, as an exemplary embodiment, a block diagram of a device 200 for supplying lubricant to a lubrication point 110. The structure of the device 200 largely corresponds to that of FIG. 1, but the lubricant pump unit 120 has a hydraulic motor 228 instead of an electric motor. Accordingly, the control unit 130 includes a hydraulic unit 250 for controlling the lubricant pump unit 120, which hydraulic unit 250 is connected to the hydraulic motor 228 of the lubricant pump unit 120 via a control valve 252. The control valve 252 can be controlled by the comparison signal of the controller 132 and throttles or opens the flow of the hydraulic fluid from the hydraulic unit 250 to the hydraulic motor 228 so that the power (output or performance) of the hydraulic motor 228, and thereby the lubricant flow rate, is regulated. In other words, the lubricant pump unit 120 includes a hydraulic motor 228, and the control unit 130 regulates a power of the hydraulic motor 228 via a control valve 252 in a hydraulic line (conduit) between a hydraulic unit 250 and the hydraulic motor 228.

In addition, FIG. 2 shows a hydraulic tank 254 which is connected to the hydraulic unit 250, and a pressure limiting valve 256 which is disposed between the hydraulic unit 250 and the control valve 252 in order to prevent excess pressure in the hydraulic line if the control valve 252 severely throttles the flow in the hydraulic line.

The optional or alternative embodiments described in the context of the disclosure and/or in the example shown in FIG. 1 can also be implemented in a corresponding manner for the device 200.

Figure 3:
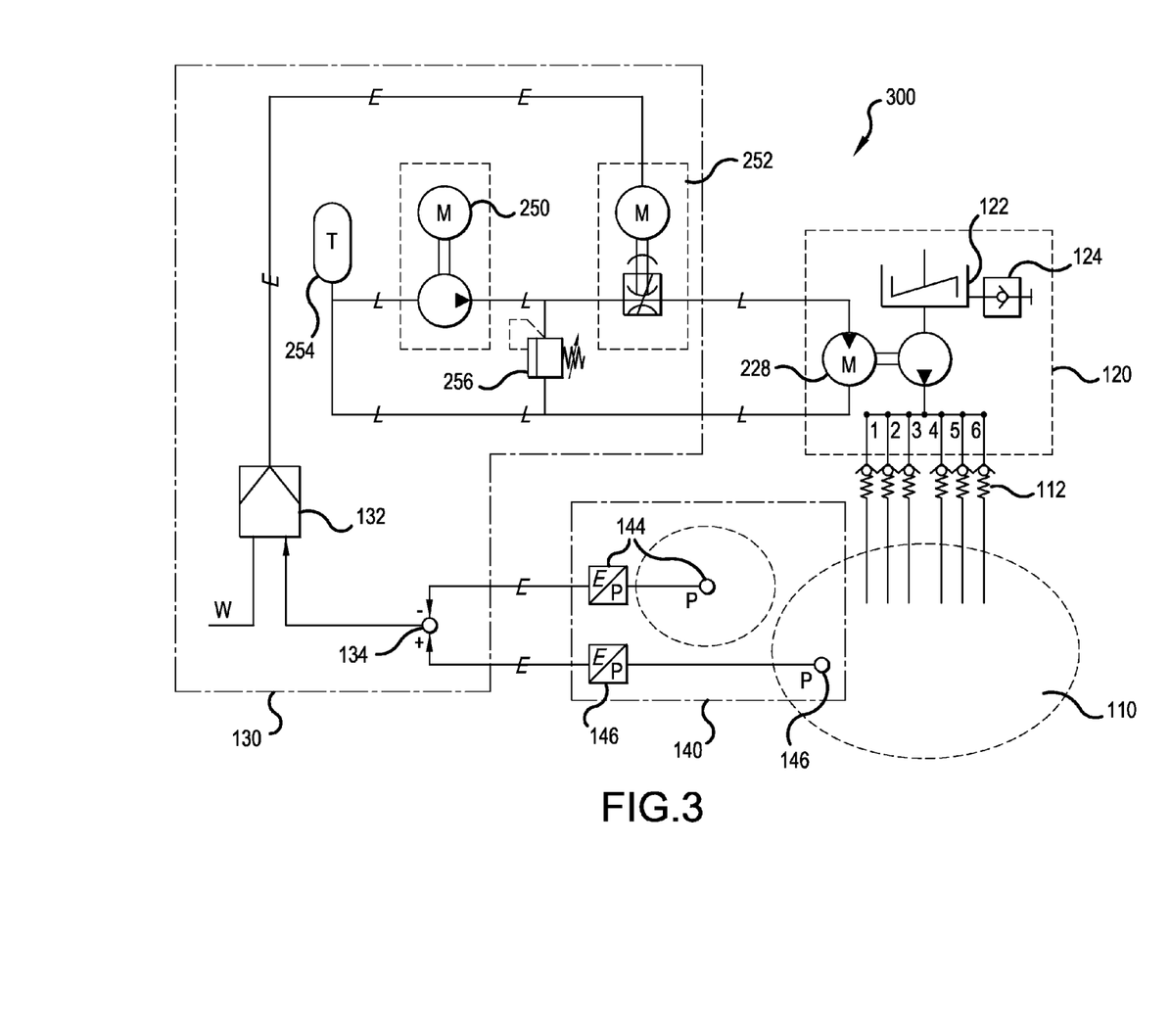
FIG. 3 is a schematic diagram showing a device for supplying lubricant that utilizes pressure-dependent automatic hydraulic controlling of a flow rate.

FIG. 3 shows as an exemplary embodiment a block diagram of a device 300 for supplying lubricant to a lubrication point 110 in a machine. The device 300 largely corresponds to the device shown in FIG. 2. However, the device 300 includes only two pressure sensors 144, 146 and no temperature sensor. The regulation of the lubricant supply to the lubrication point 110 is thus effected as a function of pressure, but not as a function of temperature.

Further additional or alternative implementation options, which have been described in the context of the general disclosure and/or in the context of the examples in FIGS. 1 and 2, can similarly be implemented for the device 300.

Alternatively, the lubricant pump unit 120 of the device shown in FIG. 1, 2, or 3 can also include a pneumatic pump, and the control unit 130 can be designed to control the pressure in a line to the pneumatic pump, for example via a pressure control valve between a compressed air supply and the pneumatic pump.

Some exemplary embodiments are directed to a device which is viscosity-regulating (viscosity of the lubricant), vibration-regulating (vibration of the machine) and/or rotational-speed-regulating (e.g. cutter head/drive rotational speed).

Figure 4:
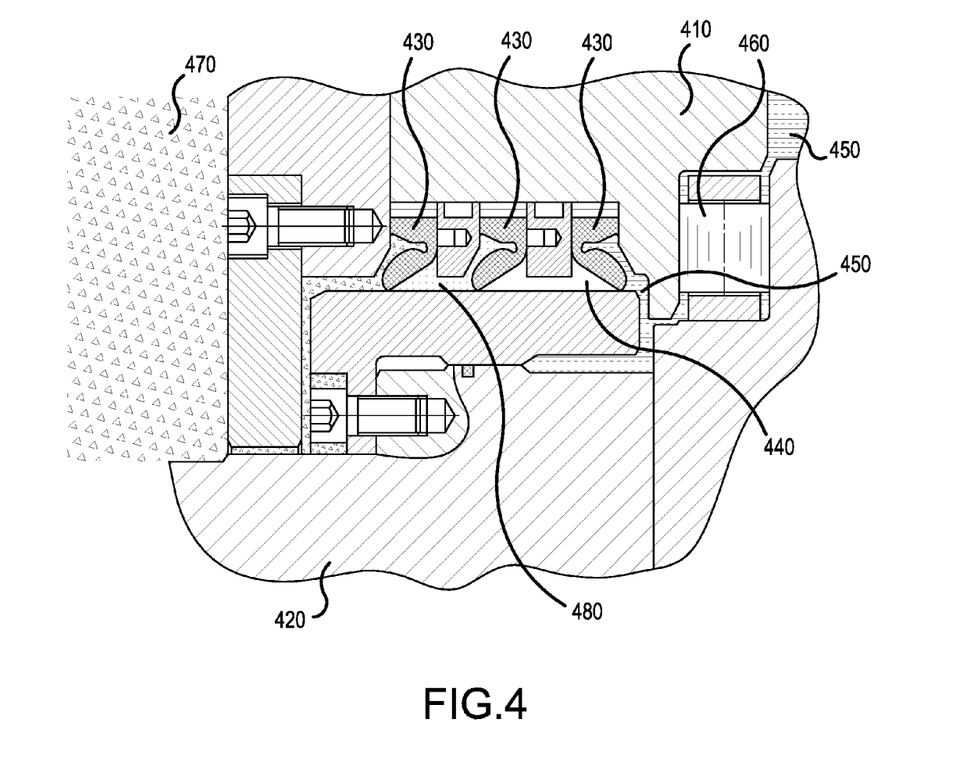
FIG. 4 is a cross-section through a part of a cutter head of a tunnel boring machine that may include a lubrication system according to an embodiment.

FIG. 4 shows a part of a cross-section of the cutter head drive of a tunnel boring machine. The cutter head attachment 420 rotates during a boring operation driven by a main drive, supported by a sealed bearing assembly 460 (e.g. axial cylindrical roller bearings), in the bearing ring for the axial cylindrical roller bearing 410. Three shaft seal rings 430 are disposed between the bearing ring 410 and the cutter head attachment 420 for sealing the bearing 460 from an external region 470 (a region in which, e.g., direct contact with sand, water, and rock occurs). The lubricant 480 (e.g. grease) is introduced between the outer shaft seal ring and the middle shaft seal ring and is supplied from the lubricant pump unit. Between the middle shaft seal ring and the inner shaft seal ring is a compressed air space, and the inside of the inner shaft seal ring, e.g., the region of the bearing 460, is filled with oil 450. A temperature measurement can be taken, for example, in the region between the outer and the middle shaft seal ring, and a pressure measurement can be taken, for example, in the region between the bearing ring 410 and the cutter head attachment 420 on the side of the outer shaft seal ring facing away from the lubricant 480. Additionally or alternatively, a pressure measurement can be taken in the region of the lubrication point between the outer shaft seal ring and the middle shaft seal ring. Here the lubrication point can be considered to be the entire region wherein the lubricant 480 is disposed, or the contact surface between outer shaft seal ring 430 and cutter head attachment 420.

One possible application of the described concept is a tunnel boring machine including a device such as is shown, for example, in FIGS. 1 to 3.

Figure 5:
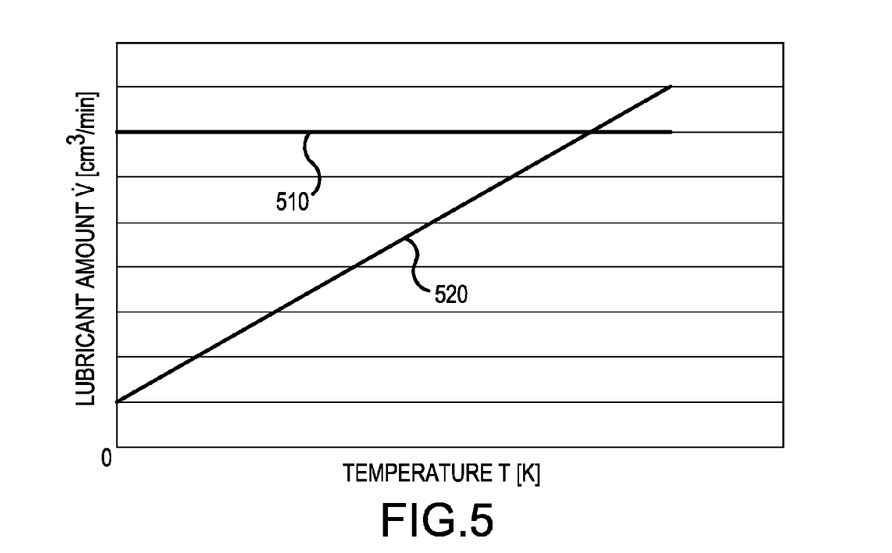
FIG. 5 is a graph relating a supplied quantity of lubricant to temperature.

Using the above-described concept, for example in the form of the specific exemplary embodiments, lubricant consumption in a machine can be significantly reduced. FIG. 5 shows a diagram or graph of a lubricant flow rate $\dot{V}$ (in $cm^3/min$) with respect to temperature T (in K). Here the horizontal line 510 shows lubricant consumption with a constant supplying of lubricant based on worst-case lubrication requirement assumptions, and the diagonal or oblique line 520 shows lubricant consumption according to the described concept, taking into account, for example, a measured temperature at the lubrication point. Here the supplied quantity of lubricant can be significantly reduced at lower temperatures, because in general the viscosity of a lubricant is higher at lower temperatures.

Figure 6:
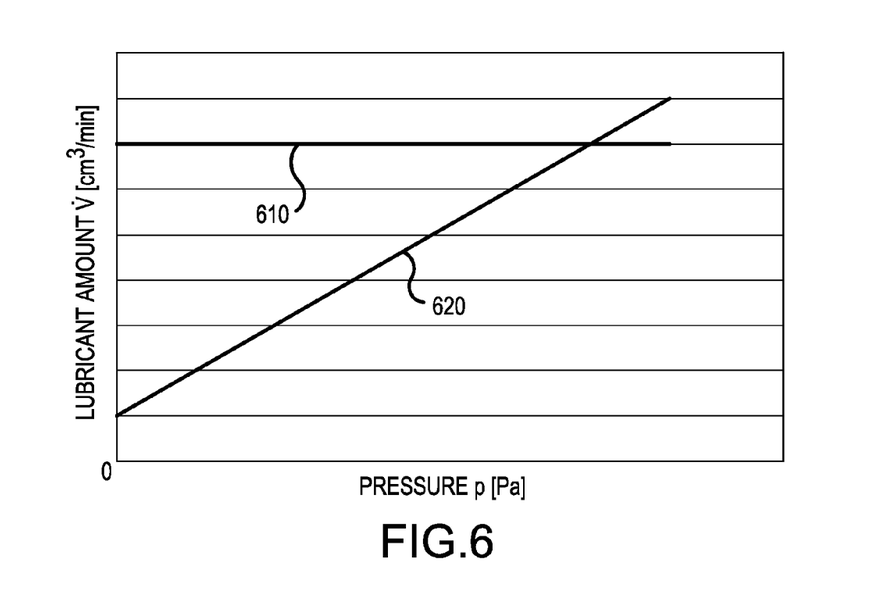
FIG. 6 is a graph relating a supplied quantity of lubricant to pressure.

FIG. 6 shows a diagram or graph of a lubricant flow rate $\dot{V}$ (in $cm^3/min$) with respect to the pressure p (in Pa). Here the horizontal line 610 shows lubricant consumption under constant worst-case lubrication requirement assumptions, and the diagonal or oblique line 620 shows lubricant consumption with the use of the described concept. Here the lubricant flow rate can be significantly reduced at low pressure, since in general the risk of contaminants entering the lubrication point is lower when external pressures are low.

Some exemplary embodiments relate to a method for supplying lubricant to a lubrication point 110 in a machine. The method may comprise receiving a sensor signal that depends on a temperature measured in a region of a lubrication point or on a pressure measured in a region of the lubrication point, a measured viscosity of the lubricant, a measured dielectricity of the lubricant, a measured water content of the lubricant, a vibration intensity measured at a part of the machine, or a measured rotational speed of a part of the machine, and supplying the lubricant at the lubrication point. The method further comprises regulating, based on the sensor measurement signal, a quantity of lubricant supplied to the lubrication point.

The method can include further optional or alternative method steps which correspond to the above-described optional or alternative device features.

Some exemplary embodiments relate to a device, in particular a pump, having variable, need-based lubricant flow-rate regulation. This can for example be applied in any situation in which pressure and/or temperature changes must be compensated for, e.g. in tunnel boring machines.

A pump can be developed which regulates the quantity of lubricant in a pressure- and/or temperature-dependent manner, so that lubricant consumption is reduced and the reliability of machine operation can increased.

The supplying of lubricant can be controlled as needed using the concept described. A fixed quantity of lubricant no longer needs to be supplied at a fixed rate that is suitable for all temperature and pressure influences. Lubricant consumption thus no longer needs to be substantially greater than the quantity actually required.

In other words, an overlubrication and thus an increased lubricant consumption can largely be prevented by a need-based, controllable lubricant flow rate in total loss lubrication and circulation lubrication.

On the one hand, lubricant consumption can be reduced in normal operation, and especially in partial-load operation. On the other hand, in particularly adverse conditions an increased quantity of lubricant can be supplied to the lubrication point as needed.

In applications wherein different pressures and temperatures occur at the lubrication point, a controlled quantity of lubricant is useful. This is for example the case in tunnel boring. In so-called shield tunneling methods, tunnel boring machines (TBMs) are now often used. If an unstable tunnel/working face is expected, special TBMs having Mixshields are used. Here the excavation chamber is filled with a support and sliding medium, a bentonite suspension, for example, in order to prevent the collapse of the tunnel face. The pressure that is built up in the excavation chamber in front of the cutter head corresponds to the approximate earth and water pressure. This is dependent on, among other things, bore depth and groundwater conditions. The pressure can vary and may be between about 1 and 10 bar.

The bearing ring rotates around the cutter head attachment during the excavation process, and the bearing ring is supported by the sealed bearing assembly. Here a rotating seal can be used, as shown in FIG. 4. Rolling-element bearings can be used for supporting the forces. The rolling-element bearings (e.g. axial cylindrical roller bearings) and the rotating seals require a certain quantity of lubricant in order to reduce wear and ensure seal tightness. This lubricant is supplied from a pump to the lubrication points.

With conventional lubrication, the quantity of lubricant supplied is constant. This leads to a constant overlubrication in order to avoid underlubrication. The optimal required quantity of lubricant can vary because pressure and temperature in the excavation chamber change with the environment. The degree of overlubrication thus depends on the operating conditions.

It is desirable to reduce these overlubrication conditions to a minimum and supply a need-based, regulated quantity of lubricant to the lubrication points. The quantity of lubricant required can be regulated using a characteristic map (factor) or lookup table, which depends on ambient pressure and lubricant temperature. With changing pressure and temperature, under certain circumstances a lesser quantity of lubricant may be required in order to achieve an optimal lubrication. This factor can be chosen such that in good conditions the delivery rate is reduced, and lubricant is thereby conserved.

The lubricant pump can deliver (supply) an approximately constant quantity of lubricant even in the presence of a back pressure/counterpressure of up to 100 bar or even higher. Instead of holding the pressure constant, the delivery (supply) pressure of the pump can automatically adapt to changing pressure conditions, e.g. in the region of the lubrication point. The supply rate can therefore be regulated in a pressure- and temperature-dependent manner, e.g. by piston-stroke adjustment or rotational speed adjustment of the drive motor (e.g. frequency regulation in electric motors, or flow regulation in hydraulic motors, or pressure regulation in pneumatic drives).

Sensors can measure the environment-dependent pressure and temperature behind the lubrication point and in front of the lubrication point (e.g. in the excavation chamber). For example, the same pressure or even a slight overpressure is needed at the lubrication point compared to the pressure in the excavation chamber in order to substantially prevent the entry of dirt or contaminants behind (past) the seals and into the bearing. Here the pressure behind the lubrication point can be increased by increasing the supply rate. With high back pressure in the excavation chamber, under certain conditions a greater quantity of lubricant may be needed than with lower back (counter) pressure or even an unpressurized state.

At high temperature, grease can for example be less viscous, thereby offering less resistance and escaping more easily through the seal lips, for which reason a greater quantity of grease could be required. Conversely, a lesser quantity of grease is required at lower temperatures.

$$\dot{V}_{lubricant} = f(p_{bearing,\ lubricant\ point},\ T_{lubricant,\ seal})$$

Accordingly, the flow rate of lubricant $\dot{V}$ can be regulated as a function of the temperature (e.g. the temperature of the lubricant or of the seal) and/or of the pressure (e.g. in the bearing and/or at the lubrication point), as shown e.g. in FIGS. 5 and 6. Lubricant properties can deteriorate under higher pressures (e.g. in grease: increased tendency to bleed, degraded lubricating properties, etc.) Likewise, the demand on lubricants increases at increasing temperatures (decreasing viscosity leading to more leakage losses; in grease, additionally: increased oil bleeding out of the thickener, etc.).

In some examples, an existing hydraulic unit can supply the hydraulic fluid via a controllable valve to the hydraulic motor of the lubricant pump, or an electric motor may receive power via a supply line, or a pneumatic drive may receive air from a compressed air supply (compressor) via a pressure control valve. The lubricant pump can supply the lubricant to the respective lubrication points via one or more pump elements and lines.

Sensors can measure the pressure (p) and the temperature (T) at the lubrication points. These can be normalized or mapped onto a predetermined range of values (e.g. to a range of 4 to 20 mA or 0 to 10 V), and forwarded together to a controller (e.g. a PID/proportional-integral-differential controller) which is influenced by the setpoint value w.

The controller can evaluate the signals and influence the rotational speed of the motor of the lubricant pump via a control valve (flow control valve) in hydraulic motors, or a variable-frequency drive in electric motors, or by changing an air pressure in pneumatic drives.

An example of automatic pressure- and temperature-dependent regulation of the flow rate is illustrated in FIG. 2, and in FIG. 3 a pressure-dependent automatic hydraulic controlling of the flow rate is shown.

The features disclosed in the foregoing description, in the claims that follow, and in the drawings can be relevant individually, as well as in any combination, to the realization of the various embodiments.

Although some aspects of the present disclosure have been described in the context of a device, it is to be understood that these aspects also represent a description of a corresponding method, so that a block or a component of a device is also understood as a corresponding method step or as a characteristic of a method step, for example a method for manufacturing or operating a device for supplying lubricant. In an analogous manner, aspects which have been described in the context of or as a method step also represent a description of a corresponding block or detail or feature of a corresponding device.

The above-described exemplary embodiments represent only an illustration of the principles of the present disclosure. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

100 Device for supplying lubricant
110 Lubrication point

112 Check valve
120 Lubricant pump unit
122 Container with lubricant
124 Valve for filling
126 Electric motor
130 Control unit
132 Controller (Regulator)
134 Subtractor
136 Adder
138 Variable-frequency drive
140 Sensor unit
142 Temperature sensor
144 First pressure sensor
146 Second pressure sensor
200 Device for supplying of lubricant
228 Hydraulic motor
250 Hydraulic unit
252 Control valve
254 Tank
256 Pressure limiting valve
300 Device for supplying of lubricant
400 Part of a cutter head of a tunnel boring machine
410 Bearing ring
420 Cutter head attachment
430 Shaft seal ring
440 Compressed air
450 Oil
460 Axial cylindrical roller bearing
470 Sand, water, rock
480 Lubricant
510 Temperature-independent consumption of lubricant
520 Temperature-dependent consumption of lubricant
610 Pressure-independent consumption of lubricant
620 Pressure-dependent consumption of lubricant

What is claimed is:

1. A device for supplying lubricant to a lubrication point in a machine, the device comprising:
a lubricant pump configured to supply a quantity of lubricant to the lubrication point;
a sensor unit including:
a first pressure sensor located outside a region of the lubrication point, the first pressure sensor being configured to measure an external environmental pressure outside the region of the lubrication point and to generate a first sensor measurement signal based upon the measured external environmental pressure, and
a second pressure sensor located within the region of the lubrication point, the second pressure sensor being configured to measure a pressure of the lubricant at the lubrication point and to generate a second sensor measurement signal based upon the measured pressure of the lubricant,
a temperature sensor located in the region of the lubrication point for measuring a temperature of the lubricant at the lubrication point, the temperature sensor being configured to generate a third sensor measurement signal, and
a control unit operably coupled to the first and second pressure sensors and configured to regulate the lubricant pump to vary the quantity of lubricant supplied to the lubricant point based at least in part on the first and second sensor measurement signals,
wherein the control unit is configured to regulate the lubricant pump to vary the quantity of lubricant based at least in part on a differential signal of the first sensor measurement signal and the second measurement signal,
wherein the control unit is configured to regulate the lubricant pump to vary the quantity of lubricant based at least in part on a sum signal of the third sensor measurement signal and the differential signal.

2. The device according to claim 1, wherein the control unit is configured to regulate the lubricant pump to vary the quantity of lubricant supplied to the lubrication point so that the pressure of the lubricant in the region of the lubrication point is equal to or higher than the external environmental pressure measured outside the region of the lubrication point.

3. The device according to claim 1, wherein the control unit has a controller configured to generate a comparison signal based on a comparison of a setpoint value with the sum signal, wherein the control unit is configured to regulate the lubricant pump to vary the quantity of lubricant supplied to the lubrication point based at least in part on the comparison signal.

4. The device according to claim 3, wherein the lubricant pump includes an electric motor and the control unit is configured regulate an output of the electric motor via a variable-frequency drive.

5. The device according to claim 3, wherein the lubricant pump includes a hydraulic motor, and the control unit is configured to regulate an output of the hydraulic motor via a control valve in a hydraulic line between a hydraulic unit and the hydraulic motor.

6. The device according to claim 3, wherein:
the first pressure sensor is external to the lubrication point, the lubricant pump and conduits leading from the lubricant pump to the lubrication point and
the first pressure sensor does not measure the pressure of the lubricant.

7. A tunnel boring machine including the device according to claim 6 and a bearing assembly, the lubrication point being located in the bearing assembly.

8. The device according to claim 6, wherein the control unit is configured to regulate the lubricant pump to vary the quantity of lubricant supplied to the lubrication point so that the pressure of the lubricant in the region of the lubrication point is equal to or higher than the external environmental pressure measured outside the region of the lubrication point.

9. The device according to claim 1, wherein the lubricant pump includes a pneumatic pump, and the control unit is designed to regulate a pressure in a line to the pneumatic pump via a pressure control valve between a compressed air supply and the pneumatic pump.

10. A tunnel boring machine including the device according to claim 1 and a bearing assembly, the lubrication point being located in the bearing assembly.

11. A tunnel boring machine comprising:
a cutter head attachment;
a bearing assembly rotatably supporting the cutter head attachment; and
the device according to claim 1, wherein the lubrication point is located within the bearing assembly and lubricant pump is configured to supply lubricant to the lubrication point within the bearing assembly.

12. The tunnel boring machine according to claim 11, further comprising:
a shaft seal ring disposed between the bearing assembly and the cutter head attachment, the shaft sealing ring sealing the lubricant within the bearing assembly from an external environment of the tunnel boring machine.

13. The device according to claim 1, wherein the lubricant pump includes an electric motor and the control unit is configured regulate an output of the electric motor via a variable-frequency drive.

14. The device according to claim 1, wherein the control unit has a controller configured to generate a comparison signal based on a comparison of a setpoint value with the differential signal, wherein the control unit is configured to regulate the lubricant pump to vary the quantity of lubricant supplied to the lubrication point based at least in part on the comparison signal.

* * * * *